United States Patent
Son et al.

(10) Patent No.: US 12,224,408 B2
(45) Date of Patent: Feb. 11, 2025

(54) BATTERY PACK HAVING BMU COMPONENT DAMAGE PREVENTION STRUCTURE

(71) Applicant: LG ENERGY SOLUTION, LTD., Seoul (KR)

(72) Inventors: Hyuk Joon Son, Daejeon (KR); Jae Young Jang, Daejeon (KR); Jin Hyun Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 475 days.

(21) Appl. No.: 17/632,854

(22) PCT Filed: Dec. 30, 2020

(86) PCT No.: PCT/KR2020/019420
§ 371 (c)(1),
(2) Date: Feb. 4, 2022

(87) PCT Pub. No.: WO2021/145593
PCT Pub. Date: Jul. 22, 2021

(65) Prior Publication Data
US 2022/0320599 A1  Oct. 6, 2022

(30) Foreign Application Priority Data
Jan. 14, 2020  (KR) ........................ 10-2020-0004872

(51) Int. Cl.
*H01M 10/42* (2006.01)
*H01M 50/204* (2021.01)
(Continued)

(52) U.S. Cl.
CPC ....... *H01M 10/425* (2013.01); *H01M 50/204* (2021.01); *H01M 50/242* (2021.01); *H01M 50/543* (2021.01); *H01M 2010/4271* (2013.01)

(58) Field of Classification Search
CPC ....... H01M 10/425; H01M 2010/4271; H01M 50/204; H01M 50/242; H01M 50/543
See application file for complete search history.

(56) References Cited

U.S. PATENT DOCUMENTS 6,250,969 B1    6/2001  Cai
2009/0207334 A1  8/2009  Kim et al.
(Continued)

FOREIGN PATENT DOCUMENTS

CN  202201238 U  4/2012
CN  102852912 A  1/2013
(Continued)

OTHER PUBLICATIONS

English translation of WO Publication 2017-104108, Jun. 2017.*
(Continued)

*Primary Examiner* — Brittany L Raymond
(74) *Attorney, Agent, or Firm* — Birch, Stewart, Kolasch & Birch, LLP

(57) ABSTRACT

Discussed is a battery pack including a structure for reducing damage to a component of a Battery Management Unit (BMU), and more particularly, to a battery pack with a structure that mitigates a concentration of stress caused by external vibration or force on the BMU mounted on a BMU mounting part and facilitates the assembly of the BMU, so that the BMU can be stably fixed to an assembled position to reduce damage to BMU components. The battery pack includes a partition configured to divide cell mounting parts and the BMU mounting part, and the partition have a stress concentration relaxation structure.

11 Claims, 6 Drawing Sheets

(51) Int. Cl.
  *H01M 50/242* (2021.01)
  *H01M 50/543* (2021.01)

(56) References Cited

U.S. PATENT DOCUMENTS

| | | |
|---|---|---|
| 2010/0266877 A1 | 10/2010 | Ebihara et al. |
| 2012/0270074 A1 | 10/2012 | Koh |
| 2013/0157084 A1 | 6/2013 | Bang et al. |
| 2013/0164570 A1 | 6/2013 | Bang et al. |
| 2014/0065448 A1* | 3/2014 | Ahn .................. H01M 50/105 429/7 |
| 2014/0220390 A1 | 8/2014 | Park et al. |
| 2015/0037619 A1 | 2/2015 | Ahn |
| 2015/0064505 A1 | 3/2015 | Lee |
| 2015/0162650 A1 | 6/2015 | Ahn et al. |
| 2015/0228945 A1 | 8/2015 | Maruoka |
| 2018/0007787 A1 | 1/2018 | Yatsugi et al. |
| 2020/0014081 A1 | 1/2020 | Lee |

FOREIGN PATENT DOCUMENTS

| | | | |
|---|---|---|---|
| EP | 3026731 | * | 6/2016 |
| EP | 3026731 A1 | | 6/2016 |
| JP | 2005-183242 A | | 7/2005 |
| JP | 2012-99751 A | | 5/2012 |
| JP | 2013-213337 A | | 10/2013 |
| JP | 2016-91700 A | | 5/2016 |
| KR | 10-2012-0008226 A | | 1/2012 |
| KR | 10-2012-0123172 A | | 11/2012 |
| KR | 10-2013-0070740 A | | 6/2013 |
| KR | 10-2014-0032596 A | | 3/2014 |
| KR | 10-2014-0100291 A | | 8/2014 |
| KR | 10-2015-0014846 A | | 2/2015 |
| KR | 10-2016-0142975 A | | 12/2016 |
| KR | 10-2016-0142982 A | | 12/2016 |
| KR | 10-2018-0122844 A | | 11/2018 |
| WO | WO 2014/155719 A1 | | 10/2014 |
| WO | WO 2017-104108 | * | 6/2017 |
| WO | WO 2017/104108 A1 | | 6/2017 |

OTHER PUBLICATIONS

Extended European Search Report for Application No. 20914606.7 dated May 3, 2022.
International Search Report (PCT/ISA/210) issued in PCT/KR2020/019420, dated Apr. 15, 2021.

* cited by examiner (a)

(b)

(a)

(b)

BATTERY PACK HAVING BMU COMPONENT DAMAGE PREVENTION STRUCTURE

TECHNICAL FIELD

The present invention relates to a battery pack including a structure for preventing damage to components of a battery management unit (BMU).

BACKGROUND ART

Rechargeable secondary batteries are widely used in various fields ranging from electric vehicles and Energy Storage Systems (ESS) to small high-tech electronic devices such as smart phones, notebook computers, and tablet PCs.

In order to exhibit the desired capacity characteristics within the applied device, in relation to these batteries, a plurality of battery cells are mounted on the frame member and connected in series or parallel, and these batteries are also used in the form of a battery pack including a Battery Management Unit (BMU) that controls the overall operation of the battery cells.

FIG. 1 is a view schematically showing the structure of a frame member constituting a conventional battery pack.

Referring to FIG. 1, the battery pack 100 has a structure in which two battery cells 110 and 120 and one Battery Management Unit (BMU) 130 are mounted on one frame member 140.

The frame member 140 has a structure that entirely surrounds the outer periphery of the battery cells 110 and 120 and the BMU 130, and two cell mounting parts 141 and 142 to which battery cells 110 and 120 are mounted are formed on both sides of the frame member 140, respectively, and a BMU mounting part 143 on which the BMU 130 is mounted is formed between the cell mounting parts 141 and 142, and the cell mounting parts 141 and 142 and the BMU mounting part 143 are divided by partitions.

In this case, both partitions of the BMU mounting part 143 have a structure having a uniform height as a whole while forming a right angle to the bottom surface. Accordingly, the BMU 130 is fitted in a diagonal direction from one side of the BMU mounting part 143 and mounted therein, and is fixed by hooks (not shown) provided at one end of both partitions of the BMU mounting part 143.

However, when an external force is applied to the frame member 140, both partition structures of the BMU mounting part 143 as described above have a structure in which stress is concentrated in the BMU 130 mounted on the BMU mounting part 143. Accordingly, in a state in which the battery cells 110 and 120 and the BMU 130 are mounted on the frame member 140, when performing an experiment such as applying external vibration for the reliability test, in the process, the components of the BMU 130 are damaged or broken.

In addition, since the BMU 130 mounted on the BMU mounting part 143 is fixed only by a hook (not shown), due to the low fixing force, situations such as frequent movement of the BMU 130 or separation from the BMU mounting part 143 occur in the above experimental process. Therefore, this also causes a problem in which the components of the BMU 130 are damaged or broken.

(Patent Document 1) KR10-2016-0142975 A

DISCLOSURE

Technical Problem

The present invention is to solve the above-described problems, and to provide a battery pack including a structure capable of preventing damage to BMU components.

Technical Solution

A battery pack according to the present invention includes: two or more battery cells in which a positive terminal and a negative terminal protrude from one outer periphery; a Battery Management Unit (BMU) electrically connected to the positive terminal and the negative terminal of the battery cell to control an operation of the battery cells; and a frame member on which each of the battery cells and the BMU is respectively mounted, wherein the frame member includes: cell mounting parts on which the battery cells are mounted; a BMU mounting part on which the BMU is mounted; and a partition configured to divide the cell mounting parts and the BMU mounting part.

Here, the cell mounting parts are formed in a frame-shaped structure with an open upper and lower surface, and are formed at both ends of the frame member to accommodate the battery cells; wherein the BMU mounting part has an open top surface, insertingly accommodates the BMU, and is formed between the cell mounting parts; wherein the partition includes two or more areas having different heights from the bottom surface of the BMU mounting part.

In more detail, the partition includes: a first partition which is an area formed to have a predetermined first height from a bottom surface of the BMU mounting part; and a second partition formed by extending upward from an upper end portion area of the first partition by a predetermined second height.

At this time, the second partition is formed at least two or more at a predetermined interval on both sides of the upper end of the first partition.

Moreover, the battery pack further includes a fixing part for fixing the BMU mounted on the BMU mounting part, wherein the fixing part is formed on the inner wall facing the BMU mounting part of the second partition.

In more detail, the fixing part includes: a protruding part protruding from the second partition by a predetermined length in an inward direction of the BMU mounting part to prevent separation of the BMU mounted on the BMU mounting part; and a connection support part extending from both sides of the protruding part toward an inner surface of the second partition by a predetermined length in a curved shape and supporting a connection between the second partition and the protruding part.

Furthermore, the partition consisting of the first and second partitions is formed to have a slope inclined by a predetermined angle θ in the direction of the cell mounting parts.

Moreover, the partition is formed to have a predetermined height as a whole with respect to the bottom surface of the BMU mounting part, wherein a hole is formed in a lower region thereof.

Here, the hole is formed at least two or more at predetermined intervals in the length direction of the partition.

Meanwhile, the battery pack configured as described above may be applied to devices including mobile phones, notebook computers, and tablet PCs.

Advantageous Effects

The battery pack of the present invention has a structure that prevents damage to the BMU components, so that even when external vibration or force is applied while the BMU is mounted on the frame member, the stress on the BMU is dispersed by the structure and the BMU is stably fixed at the mounting position.

Accordingly, it is possible to effectively prevent damage to the BMU component parts, and further, improve the productivity of the battery pack compared to the existing process.

MODE FOR INVENTION

Figure 1:
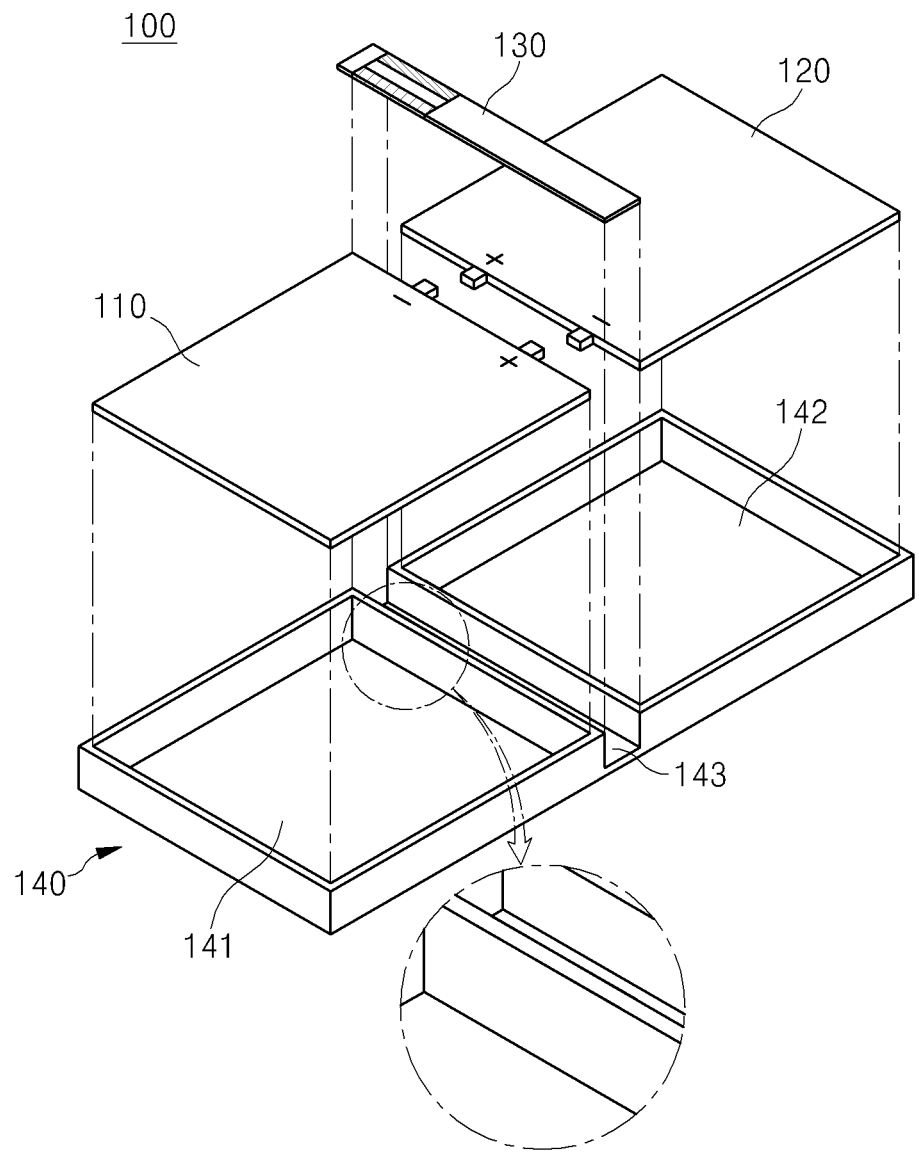
FIG. 1 is a view schematically showing the overall structure of a frame member constituting a conventional battery pack.

Hereinafter, embodiments of the present invention will be described in detail with reference to the accompanying drawings so that those of ordinary skill in the art may easily implement the present invention. However, the present invention may be implemented in various forms and is not limited to the embodiments described herein. In the drawings, parts irrelevant to the description are omitted in order to clearly describe the present invention, and like reference numerals refer to like elements throughout the specification.

Hereinafter, the present invention will be described in detail with reference to the drawings.

Figure 2:
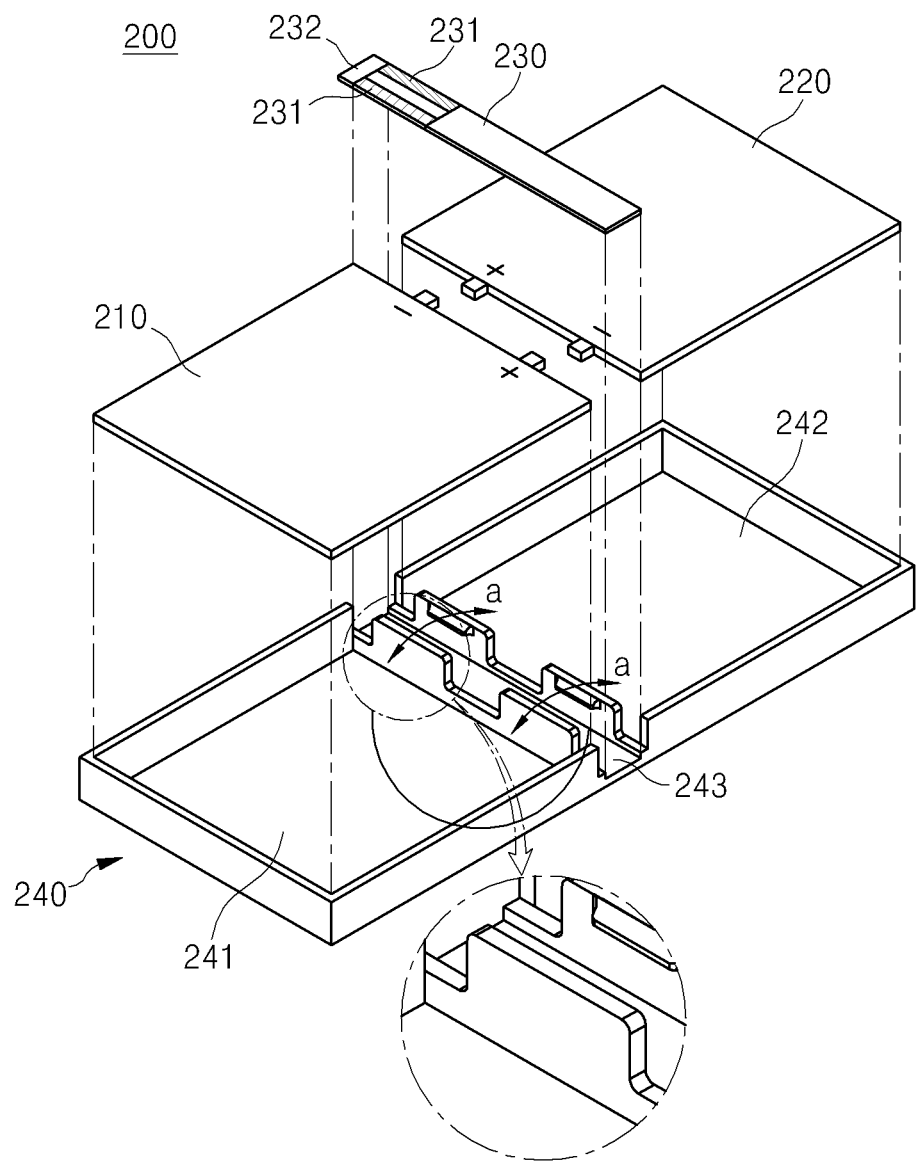
FIG. 2 is a schematic view showing the overall structure of a frame member constituting a battery pack according to an embodiment of the present invention.

FIG. 2 is a schematic view showing a battery pack according to an embodiment of the present invention, and referring to this, the battery pack 200 according to the present invention has a structure in which two battery cells 210 and 220 and one Battery Management Unit (BMU) 230 are mounted on one frame member 240.

1. Battery Cells 210 and 220

The battery pack 200 according to the present invention may include one or more battery cells having a structure in which a positive terminal and a negative terminal protrude from at least one outer periphery. The battery cells 210 and 220 may be mounted on the cell mounting parts 241 and 242 provided at the frame member 240 to be described later, respectively.

2. Battery Management Unit (BMU) 230

The BMU 230 includes components (not shown) for controlling charging/discharging, cooling, and the like of the battery cells 210 and 220, and has a known configuration that is electrically connected to the positive and negative terminals of the battery cells 210 and 220 to control the overall operation of the battery cells 210 and 220.

In a state in which the external input/output terminal 232 connected by the wire 231 protrudes outward from the outer periphery of the frame member 240, the BMU 230 may be mounted on the BMU mounting part 243 of the frame member 240 to be described later.

3. Frame Member 240

Figure 3:
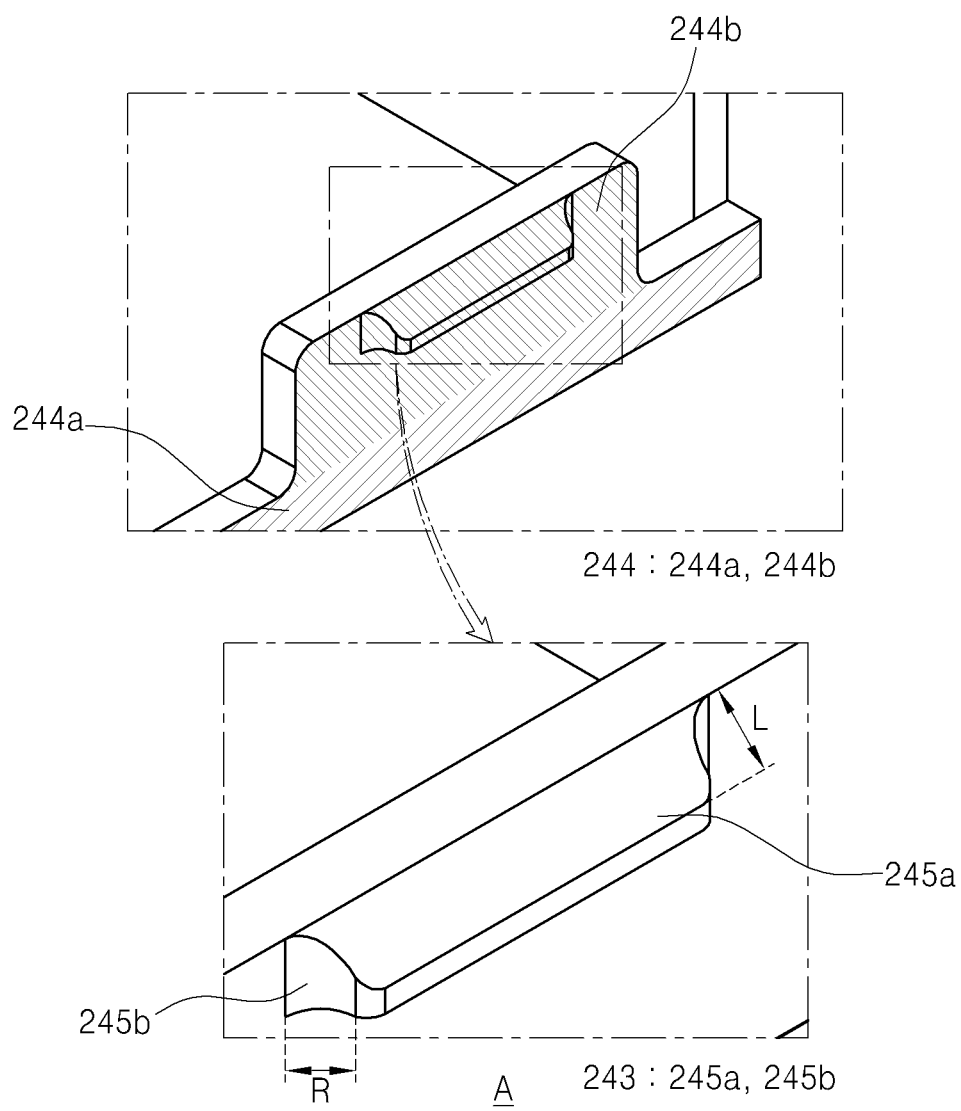
FIG. 3 is a diagram illustrating an inner part of a partition according to an embodiment of the present invention.

The frame member 240 has a structure that entirely surrounds the outer peripheries of the battery cells 210 and 220 and the BMU 230 as shown in FIGS. 2 and 3, and has a structure in which the upper and lower surfaces of the battery cells 210 and 220 are opened respectively.

3.1. Cell Mounting Parts 241 and 242

The cell mounting parts 241 and 242 has a configuration in which the battery cells 210 and 220 are mounted, respectively. The cell mounting parts 241 and 242 are formed on both sides of the frame member 240, respectively, and have a frame-shaped structure with open upper and lower surfaces. Therefore, the battery cells 210 and 220 mounted on the cell mounting parts 241 and 242 are mounted so that only their outer peripheries are wrapped.

3.2. BMU Mounting Part 243

The BMU mounting part 243 has a configuration in which the BMU 230 is mounted. The BMU mounting part 243 is formed between the cell mounting parts 241 and 242, and the upper surface of the BMU mounting part 243, which is a surface opposite to the bottom surface of the BMU 230 mounting part, has an open structure. Accordingly, the BMU 230 can be mounted from the upper surface toward the bottom surface of the BMU mounting part 243.

3.3. Partition 244

The partition 244 separates the cell mounting parts 241 and 242 from the BMU mounting part 243, and has a structure that stably fixes and supports the BMU 230 mounted on the BMU mounting part 243.

Embodiment 1 of Stress Concentration Relaxation Structure

Specifically, FIG. 3 is a diagram showing a part of a partition. Referring to FIG. 3, the partition 244 according to the present invention includes a first partition 244a, which is an area formed to have a predetermined first height from the bottom surface of the BMU mounting part 243, and a second partition 244b, which is an area formed by extending upward by a predetermined second height from a portion of the upper end of the first partition 244a.

In simple terms, the partition 244 is composed of two regions having different heights, and these regions are referred to by being divided into the first partition 244a and the second partition 244b, respectively.

As described above, the partition 244 composed of the first and second partitions 244a and 244b having different heights can prevent the stress generated by external vibrations or forces from being concentrated on the BMU 230 when the BMU 230 mounted on the BMU mounting part 243.

Figure 4:
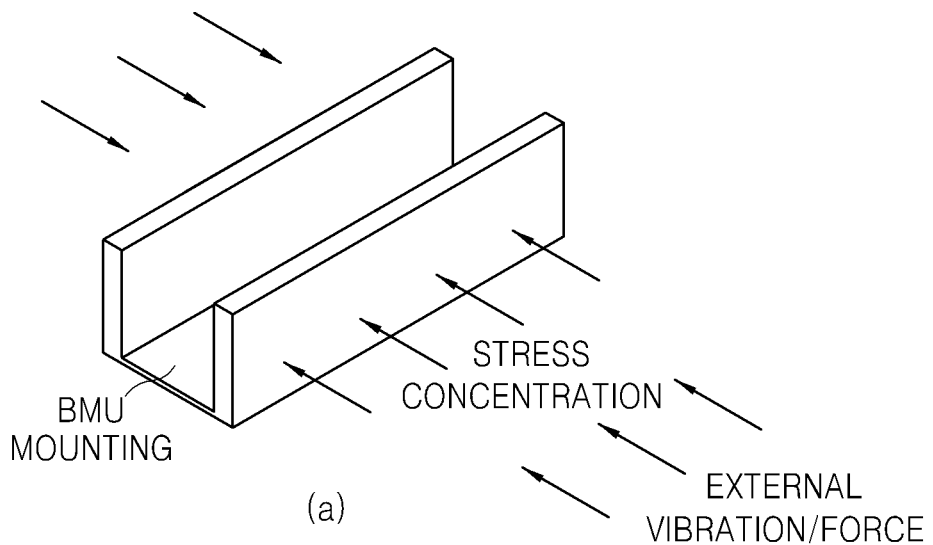
FIG. 4 is a diagram schematically showing the principle of a partition structure according to an embodiment of the present invention.
Figure 4:
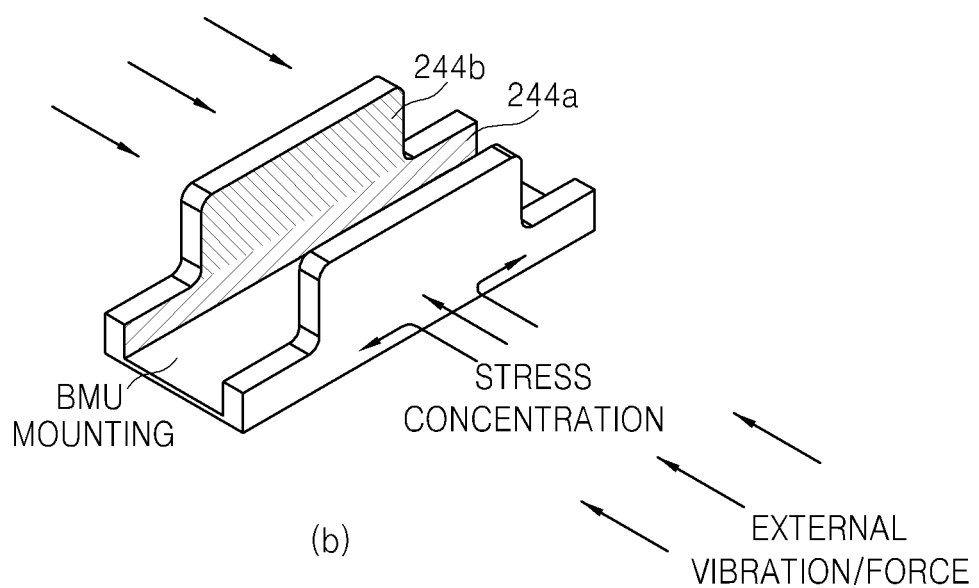

FIG. 4 is a diagram schematically showing the principle of a partition structure according to the present invention. As shown in (a) of FIG. 4, the conventional partition is made of a uniform height overall. Therefore, when external vibration or force is applied, since stress is concentrated in the BMU mounted on the BMU mounting part, there is a problem that the BMU components are damaged or broken.

In order to improve this, as shown in (b) of FIG. 4, the partition of the present invention is composed of first and second partitions 244a and 244b, which are regions having different heights. By the left and right blank areas of the second partition 244b formed according to the height difference between the first partition 244a and the second partition 244b, it is possible to exert an effect of alleviating concentration in the BMU 230 by dispersing the stress generated by external vibration or force.

That is, the partition 244 composed of the first and second partitions 244a and 244b having different heights according to the present invention has a structure that mitigates the concentration of stress generated by external vibration or force on the BMU 230. When conducting an experiment such as applying external vibration to the reliability test of the battery pack by this structure, in the process, there is an effect of reducing the occurrence of a problem of damage or breakage of components of the BMU 230. Furthermore, accordingly, it may result in improved productivity compared to the existing process.

In addition, by the partition 244 structure consisting of first and second partitions 244a and 244b having different heights, the elasticity characteristics of the material of the frame member 240 are effectively exhibited. Accordingly, when the BMU 230 is mounted in the front direction of the BMU mounting part 243, as the partition 244 is pushed, the BMU 230 is inserted and mounted, thereby making it easier to mount the BMU.

Embodiment 2 of Stress Concentration Relaxation Structure

Figure 5:
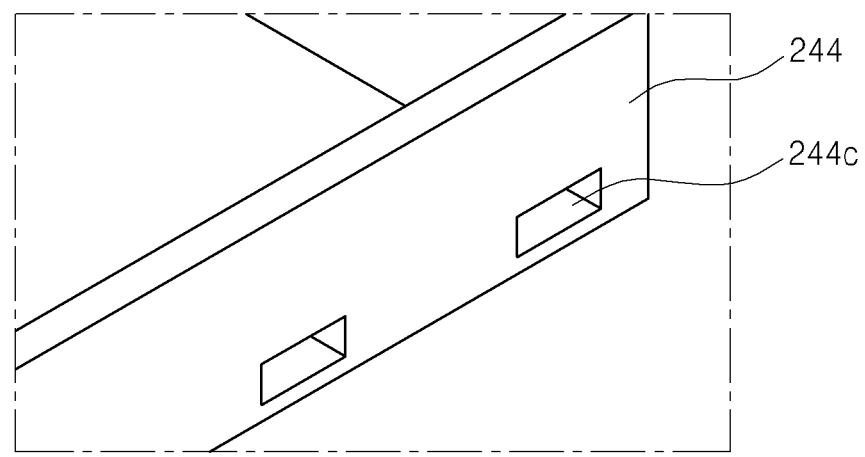
FIG. 5 is a schematic diagram of a part of a partition structure according to another embodiment of the present invention

As another embodiment for alleviating the stress concentration on the BMU, as shown in FIG. 5, the partition 244 may be formed to have a constant height from the bottom surface of the partition 244 as a whole, but may have a structure in which a hole 244c is formed in a lower region thereof.

In the case of forming the hole 244c, the hole 244c distributes the stress generated by external vibration or force, and thus, compared to the prior art, the concentration of stress on the BMU is alleviated, so that damage or breakage of BMU components can be reduced.

Here, even when the hole 244c is formed in the partition 244, like the second partition 244b of the first embodiment, at least two of the holes 244c may be formed at predetermined intervals.

On the other hand, the partition 244 configured as described above has a form having an inclination a in the direction of the arrow shown in FIG. 2, and specifically, may be formed to be inclined by a predetermined angle θ in the direction of the cell mounting parts 241 and 242, respectively.

Figure 6:
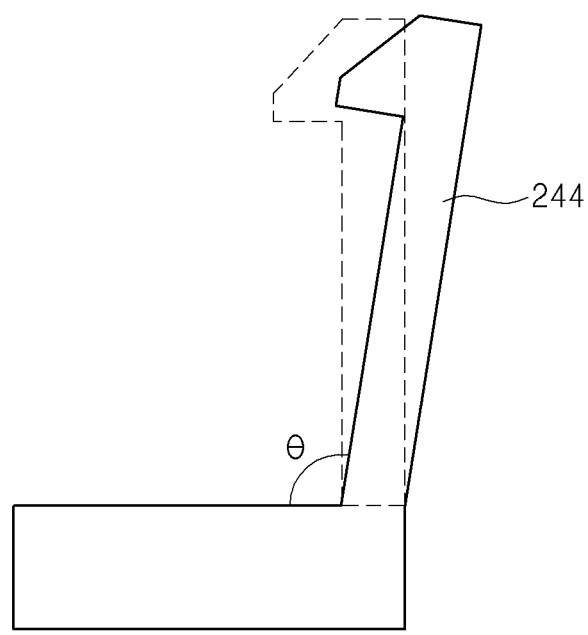
FIG. 6 is a diagram schematically showing a state of one partition as viewed from the front.

FIG. 6 is a cross-sectional view schematically illustrating a view of one side partition of both partitions when viewed from the front. Referring to this, compared to the partition being at right angles to the bottom surface as indicated by dotted lines conventionally, the partition 244 according to the present invention has a structure inclined by a predetermined angle θ in the direction of the cell mounting parts.

The reason is that when assembling the BMU 230, as the partition 244 is composed of first and second partitions 244a and 244b having different heights, for example, it can be assembled by pressing the BMU 230 in the front direction of the BMU mounting part 243 using a pressing jig and mounting it. At this time, if the partition 244 is formed to be inclined by a predetermined angle θ in the direction of the cell mounting parts 241 and 242, which is not vertical, the inclined partition 244 functions to easily position the BMU 230 on the front surface of the BMU mounting part 243. Therefore, it has an effect of improving the assembling property of the BMU 230 to the BMU mounting part 243.

In other words, the partition 244 inclined by a predetermined angle θ in the direction of the cell mounting parts 241 and 242 has a structure that absorbs the tolerance of the mounting position of the BMU 230 with respect to the BMU mounting part 243 and has an effect of improving the assembling property of the BMU 230.

Here, the predetermined angle θ may be set within a range in which the partition 244 can effectively exhibit the above-described functions.

Meanwhile, at least two second partitions 244b formed by extending upward from the first partition 244a by a predetermined second height may be configured in one partition. In order to maximize the stress concentration relaxation effect on the BMU 230, for example, it may be desirable to form two second partitions 244b at regular intervals.

In other words, based on the BMU mounting part 243, it may be desirable that two second partitions 244b are configured at regular intervals at the partition 244 separating the cell mounting part 241 and the BMU mounting part 243 in the left direction, and two second partitions 244b are formed at regular intervals at the partition 244 that divides the cell mounting part 242 and the BMU mounting part 243 in the right direction.

As described above, in the present invention, the partition 244 is composed of first and second partitions 244a and 244b having different heights, and at least two or more of the second partitions 244b are formed at predetermined intervals. In addition, the partition 244 is designed to be inclined by a predetermined angle θ in the direction of the cell mounting parts 241 and 242. With this structure, it is possible to reduce the concentration of stress caused by the external vibration or force on the BMU, thereby preventing breakage and damage to the BMU components. In addition, it is possible to bring about the effect of improving the productivity compared to the existing process by improving the assembly properties of the BMU.

3.4. Fixing Part 245

The fixing part 245 is a configuration that allows the BMU 230 mounted on the BMU mounting part 243 to be stably fixed in its position, and as shown in FIG. 5, may be provided on an inner wall of the second partition 244b facing the BMU mounting part 243.

Specifically, referring to the enlarged portion A of the fixing part in FIG. 3, the fixing part 245 may include a protruding part 245a formed protruding from the second partition 244b by a predetermined length in the inner direction of the BMU mounting part 243 to fix the BMU 230 mounted on the BMU mounting part 243 so as not to be separated from the outside thereof and a connection support part 245b formed extending from both sides of the protruding part 245a toward the surface of the second partition 244b by a predetermined length in a curved shape to support the protruding part 245a to be stably connected to the second partition 244b.

Here, the length L protruding from the second partition 244b of the protruding part 245a in the inward direction of the BMU mounting part 243 may be set considering the degree to which the BMU 230 mounted on the BMU mounting part 243 can be stably fixed in its position. For example, the length L can be applied with 0.5 mm.

In addition, the length R of the curved shape extending from both sides of the protruding part 245a in the direction of the second partition 244b may be set considering the degree to which the protruding part 245a can be stably fixed to the second partition 244b. For example, the length R can be applied with 0.5 mm.

Figure 7:
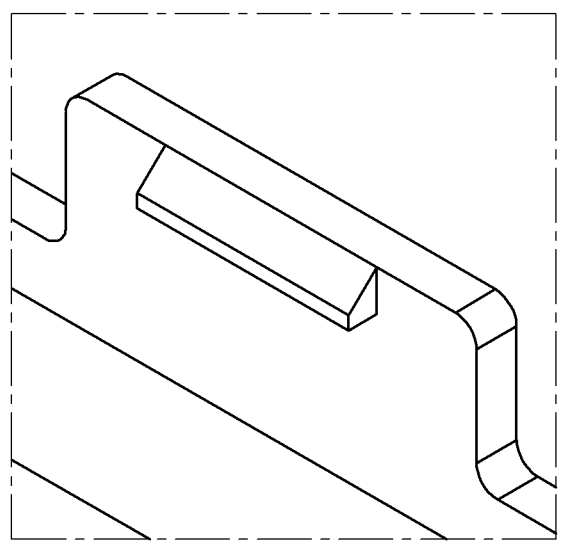
FIG. 7 is a view showing a fixing part according to an embodiment of the present invention.
Figure 7:
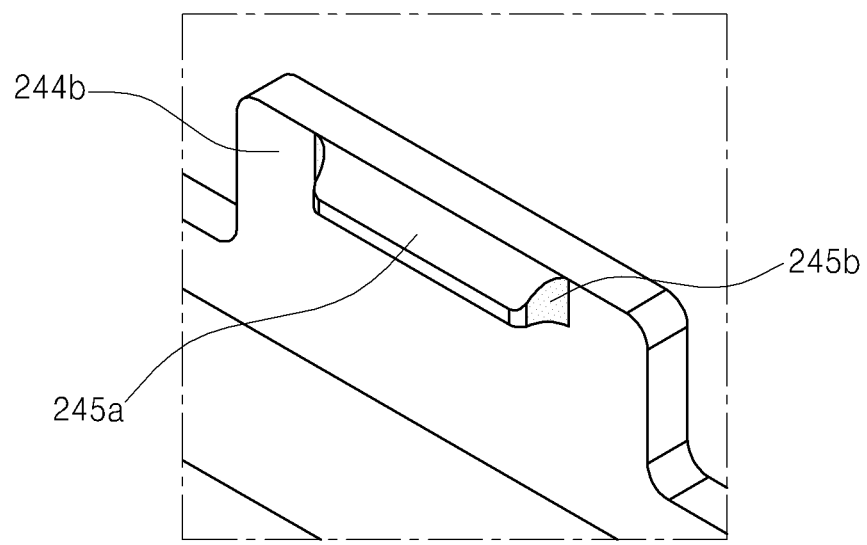

As shown in FIG. 7, (a) and (b) are showing a fixing part structure, where in (b), by additionally configuring a support part 245b connected to both sides of the protruding part 245a, the protruding part 245a is more reliably connected to the second partition 244b so that it is possible to strengthen the rigidity of the protruding part 245a. Accordingly, the protruding part 245a can more effectively exhibit a function of fixing the BMU 230 to the BMU mounting part 243.

On the other hand, although the technical idea of the present invention has been specifically described according to the above embodiment, it should be noted that the above embodiments are for the purpose of explanation and not limitation. In addition, those skilled in the art in the technical field of the present invention will be able to understand that various embodiments are possible within the scope of the spirit of the present invention.

What is claimed is:

1. A battery pack comprising:
    two or more battery cells in which a positive terminal and a negative terminal protrude from one outer periphery of each of the battery cells;
    a Battery Management Unit (BMU) electrically connected to the positive terminal and the negative terminal of each of the battery cells to control an operation of the battery cells; and
    a frame member on which each of the battery cells and the BMU is respectively mounted,
    wherein the frame member comprises:
    cell mounting parts on which the battery cells are mounted;
    a BMU mounting part on which the BMU is mounted; and
    a partition configured to divide the cell mounting parts and the BMU mounting part, and the partition having a stress concentration relaxation structure,
    wherein the partition is formed to have a slope inclined by a predetermined angle $\theta$ in a direction of the cell mounting parts, and the partition is not perpendicular with the cell mounting parts.

2. The battery pack of claim 1, wherein the cell mounting parts are formed in a frame-shaped structure with an open upper and lower surfaces, and are formed at both ends of the frame member to accommodate the battery cells;
    wherein the BMU mounting part has an open top surface, insertingly accommodates the BMU, and is formed between the cell mounting parts;
    wherein the partition comprises two or more areas having different heights from a bottom surface of the BMU mounting part.

3. The battery pack of claim 2, wherein the partition comprises:
    a first partition which is an area formed to have a predetermined first height from the bottom surface of the BMU mounting part; and
    a second partition formed by extending upward from an upper end portion area of the first partition by a predetermined second height.

4. The battery pack of claim 3, wherein the second partition is formed as at least two or more second partitions at a predetermined interval on both sides of the upper end portion area of the first partition.

5. The battery pack of claim 3, further comprising a fixing part for fixing the BMU mounted on the BMU mounting part,
    wherein the fixing part is formed on an inner wall facing the BMU mounting part of the second partition.

6. The battery pack of claim 5, wherein the fixing part comprises:
    a protruding part protruding from the second partition by a predetermined length in an inward direction of the BMU mounting part to prevent separation of the BMU mounted on the BMU mounting part; and
    a connection support part extending from both sides of the protruding part toward an inner surface of the second partition by the predetermined length in a curved shape and supporting a connection between the second partition and the protruding part.

7. The battery pack of claim 3, wherein the partition includes a pair of partitions that are parallel to each other,
    wherein a first of the pair of partitions includes at least one second section,
    wherein a second of the pair of partitions includes at least one second section, and
    wherein the at least one second section of the first of the pair of partitions and the at least one second section of the second of the pair of partitions are entirely aligned to face each other.

8. The battery pack of claim 1, wherein the partition is formed to have a predetermined height as a whole with respect to a bottom surface of the BMU mounting part, and
    wherein a hole is formed in a lower region of the partition.

9. The battery pack of claim 8, wherein the hole is formed as at least two or more holes at predetermined intervals in a length direction of the partition.

10. The battery pack of claim 1, wherein the stress concentration relaxation structure disperses concentration of stress applied to the BMU by selectively applying stress to local portions of the BMU.

11. A device comprising the battery pack according to claim 1.

* * * * *